US010580192B2

(12) United States Patent
Ohba

(10) Patent No.: US 10,580,192 B2
(45) Date of Patent: Mar. 3, 2020

(54) IMAGE PROCESSING APPARATUS, INFORMATION PROCESSING APPARATUS, AND IMAGE PROCESSING METHOD

(71) Applicant: SONY INTERACTIVE ENTERTAINMENT INC., Tokyo (JP)

(72) Inventor: Akio Ohba, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 9 days.

(21) Appl. No.: 15/768,929

(22) PCT Filed: Nov. 11, 2016

(86) PCT No.: PCT/JP2016/083489
§ 371 (c)(1),
(2) Date: Apr. 17, 2018

(87) PCT Pub. No.: WO2017/086244
PCT Pub. Date: May 26, 2017

(65) Prior Publication Data
US 2019/0057537 A1 Feb. 21, 2019

(30) Foreign Application Priority Data
Nov. 17, 2015 (JP) ................. 2015-225171

(51) Int. Cl.
G06T 15/04 (2011.01)
G06T 15/20 (2011.01)
G06T 1/60 (2006.01)
(Continued)

(52) U.S. Cl.
CPC ............ *G06T 15/04* (2013.01); *G06T 15/20* (2013.01); *G06F 3/012* (2013.01); *G06T 1/60* (2013.01); *G09G 3/2092* (2013.01)

(58) Field of Classification Search
CPC combination set(s) only.
See application file for complete search history.

(56) References Cited

U.S. PATENT DOCUMENTS 6,400,370 B1 6/2002 Lee et al.
7,355,604 B2 4/2008 Bando et al.
(Continued)

FOREIGN PATENT DOCUMENTS

JP 2003-115056 A 4/2003
JP 2005-275797 A 10/2005
(Continued)

OTHER PUBLICATIONS

Communication and Extended European search report dated Apr. 8, 2019, from European Application No. 16866246, 14 sheets.
(Continued)

Primary Examiner — Wesner Sajous
(74) Attorney, Agent, or Firm — Katten Muchin Rosenman LLP

(57) ABSTRACT

Regions 150 and 152 on a texture image plane 140 that correspond individually to pixels 146 and 148 representing an image on a texture image mapping target surface 144 in a screen plane 142 on which to define a display image are determined using predetermined transformation equations. The number of sampling points and their distribution are determined for the determined region in accordance with its shape and its size. Texel values in the determined region are then sampled. An average of the sampled values is acquired as the value of each of the original pixels 146 and 148.

9 Claims, 13 Drawing Sheets

(51) Int. Cl.
*G06F 3/01* (2006.01)
*G09G 3/20* (2006.01)

(56) References Cited

U.S. PATENT DOCUMENTS

| | | | |
|---|---|---|---|
| 2002/0012002 A1 | 1/2002 | Ito | |
| 2006/0119608 A1 | 6/2006 | Prokopenko et al. | |
| 2006/0250409 A1 | 11/2006 | Bando et al. | |
| 2008/0122536 A1* | 5/2008 | Theus | H03F 1/486 330/253 |
| 2009/0027412 A1* | 1/2009 | Burley | G06T 15/04 345/582 |
| 2013/0016112 A1* | 1/2013 | Burley | G06T 15/04 345/582 |
| 2013/0154974 A1* | 6/2013 | Murata | G06F 3/0488 345/173 |
| 2013/0257885 A1 | 10/2013 | Vaidyanathan et al. | |

FOREIGN PATENT DOCUMENTS

| | | |
|---|---|---|
| JP | 2006-293627 A | 10/2006 |
| WO | 2013/136398 A1 | 9/2013 |

OTHER PUBLICATIONS

Baoquan Chen et al: "Footprint area sampled texturing", IEEE Transactions on Visualization and Computer Graphics, IEEE Service Center, Los Alamitos, CA, US, vol. 10, No. 2, Mar. 1, 2004 (Mar. 1, 2004), pp. 230-240, XP011105539, ISSN: 1077-2626, DOI: 10.1109/TVCG.2004.1260775 *abstract*, *section 3.3: 3rd par.*.
Hanspeter Pfister et al: "Vertex-based anisotropic texturing", Proceedings Graphics Hardware 2001. ACM SIGGRAPH/ Eurographics Workshop on Graphics Hardware., Jan. 1, 2001 (Jan. 1, 2001), pp. 95-98, XP055567432, New York, NY, US DOI: 10.1145/383507.383532 ISBN: 978-1-58113-407-0 *abstract* *figures 2, 3*.
International Preliminary Report on Patentability dated Jun. 19, 2018, from PCT/JP2016/083489.
International Search Report and Written Opinion dated Dec. 27, 2016, from the corresponding PCT/JP2016/083489.
Masaaki Oka et al., Real-Time Manipulation of Texture-Mapped Surface, ACM SIGGRAPH Computer Graphics, vol. 21, No. 4, Jul. 1987, pp. 181-188.

* cited by examiner

FIG.9
(a) $\max(S_u, S_v) < 1.0$ 
(b) $1.0 \leq \max(S_u, S_v) < 4.0$ 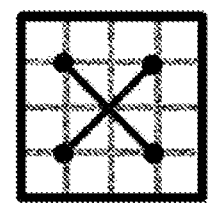
(c) $4.0 \leq \max(S_u, S_v) < 6.0$ 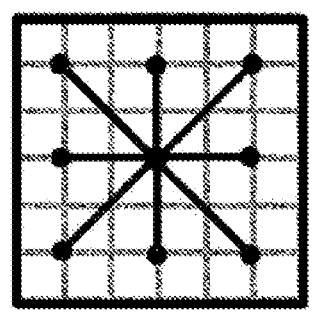
(d) $6.0 \leq \max(S_u, S_v) < 8.0$ 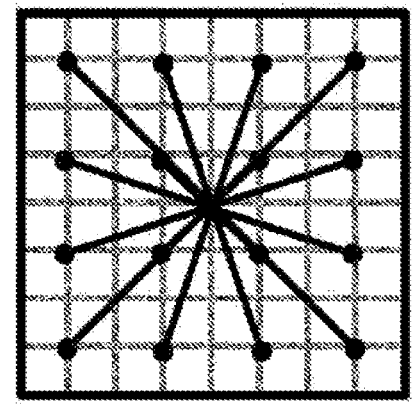

US 10,580,192 B2

IMAGE PROCESSING APPARATUS, INFORMATION PROCESSING APPARATUS, AND IMAGE PROCESSING METHOD

TECHNICAL FIELD

The present invention relates to image generating technology that uses texture images.

BACKGROUND ART

There have been proposed home-use entertainment systems capable of not only executing video game programs but also reproducing videos. This type of home-use entertainment system has a three-dimensional image generated by a graphics processing unit (GPU) using polygons (e.g., see PTL 1). For this type of system, it is always a challenge to obtain a trade-off between responsiveness for image display and image quality. Various measures have thus been devised to render high-resolution images at high speed.

For example, what is widely known is the multum in parvo (MIP) mapping technique that involves preparing a texture image representing a background at multiple resolutions so that the image may be switched from one resolution to another when rendered (e.g., see PTL 2). MIP map data is prepared beforehand by taking time to obtain high resolutions. At the time of image display, the map data need only be referenced or interpolated to efficiently generate a high-quality display image. Also proposed are techniques for linearly approximating coordinate transformation from the texture image to the display image and identifying texels in the texture image corresponding to positions in the display image by inversion of the transformation (e.g., see NPL 1).

CITATION LIST

Patent Literature

[PTL 1]
  PCT Patent Publication No. WO2013/136398
[PTL 2]
  JP 2005-275797A

Non Patent Literature

[NPL 1]
  "Real-Time Manipulation of Texture-Mapped Surface," Masaki Oka, Kyoya Tsutui, and Akio Ohba, ACM SIGGRAPH Computer Graphics, Volume 21, Number 4, July 1987, P. 181-188 (USA)

SUMMARY

Technical Problem

Suppose that with no MIP map prepared, a texture image at a given resolution is directly sampled. In that case, the farther a screen plane on which to define a display image is from a surface to which to map the texture image or the higher the resolution of the texture image, the more excessive the sampling carried out in small regions, so that flickering known as aliasing tends to occur. Using MIP maps alleviates the problem, but it takes time to prepare MIP maps as mentioned above. This can result in a non-negligible latency when the texture image itself varies over time as in the case of videos. Thus there is a need for a versatile texture mapping technique that will provide a trade-off between responsiveness for image display and image quality.

The present invention has been devised in view of the above circumstances. An object of the invention is therefore to provide a technique for obtaining a trade-off between responsiveness for image display and image quality in image generating process using a texture image.

Solution to Problem

According to one aspect of the present invention, there is provided an image processing apparatus. The image processing apparatus includes a corresponding region identifying section and a pixel value calculating section. The corresponding region identifying section determines, based on positional relations between a surface to which to map a texture image in a target space for rendering and a screen plane on which to define a display image, a region on the plane of the texture image in such a manner that the region corresponds to each of pixels representing the surface for mapping among the display image. The pixel value calculating section samples texel values in the corresponding region so as to determine and output the value of the pixel representing the surface for mapping. The pixel value calculating section changes the number of sampling points in accordance with a size of the corresponding region.

According to another aspect of the present invention, there is provided an information processing apparatus. The information processing apparatus includes a target space controlling section, a corresponding region identifying section, a pixel value calculating section, and a display image generating section. The target space controlling section establishes a screen plane on which to define a display image with respect to a point of view for a target space for rendering. The corresponding region identifying section determines, based on positional relations between a surface to which to map a texture image in the target space for rendering and the screen plane, a region on the plane of the texture image in such a manner that the region corresponds to each of pixels representing the surface for mapping among the display image. The pixel value calculating section samples texel values in the corresponding region so as to determine the value of the pixel representing the surface for mapping. The display image generating section determines the value of a pixel other than the value of the pixel representing the surface for mapping so as to complete the display image to be output. The pixel value calculating section changes the number of sampling points in accordance with a size of the corresponding region.

According to a further aspect of the present invention, there is provided an image processing method. The image processing method includes the steps of determining, based on positional relations between a surface to which to map a texture image in a target space for rendering and a screen plane on which to define a display image, a region on the plane of the texture image in such a manner that the region corresponds to each of pixels representing the surface for mapping among the display image, and sampling texel values in the corresponding region by referencing the texture image stored in a memory so as to determine and output the value of the pixel representing the surface for mapping. The step of determining the pixel value changes the number of sampling points in accordance with a size of the corresponding region.

Incidentally, if other combinations of the above-outlined composing elements or the above expressions of the present invention are converted between different forms such as a method and an apparatus, they still constitute effective embodiments of the present invention.

Advantageous Effect of Invention

According to the present invention, texture mapping is implemented in a manner offering a trade-off between responsiveness for image display and image quality in more diverse situations.

BRIEF DESCRIPTION OF DRAWINGS

FIG. 9 is a schematic diagram depicting how the number of sampling points and their distribution are typically changed by the embodiment in accordance with the size of the parallelogram.

DESCRIPTION OF EMBODIMENT

Figure 1:
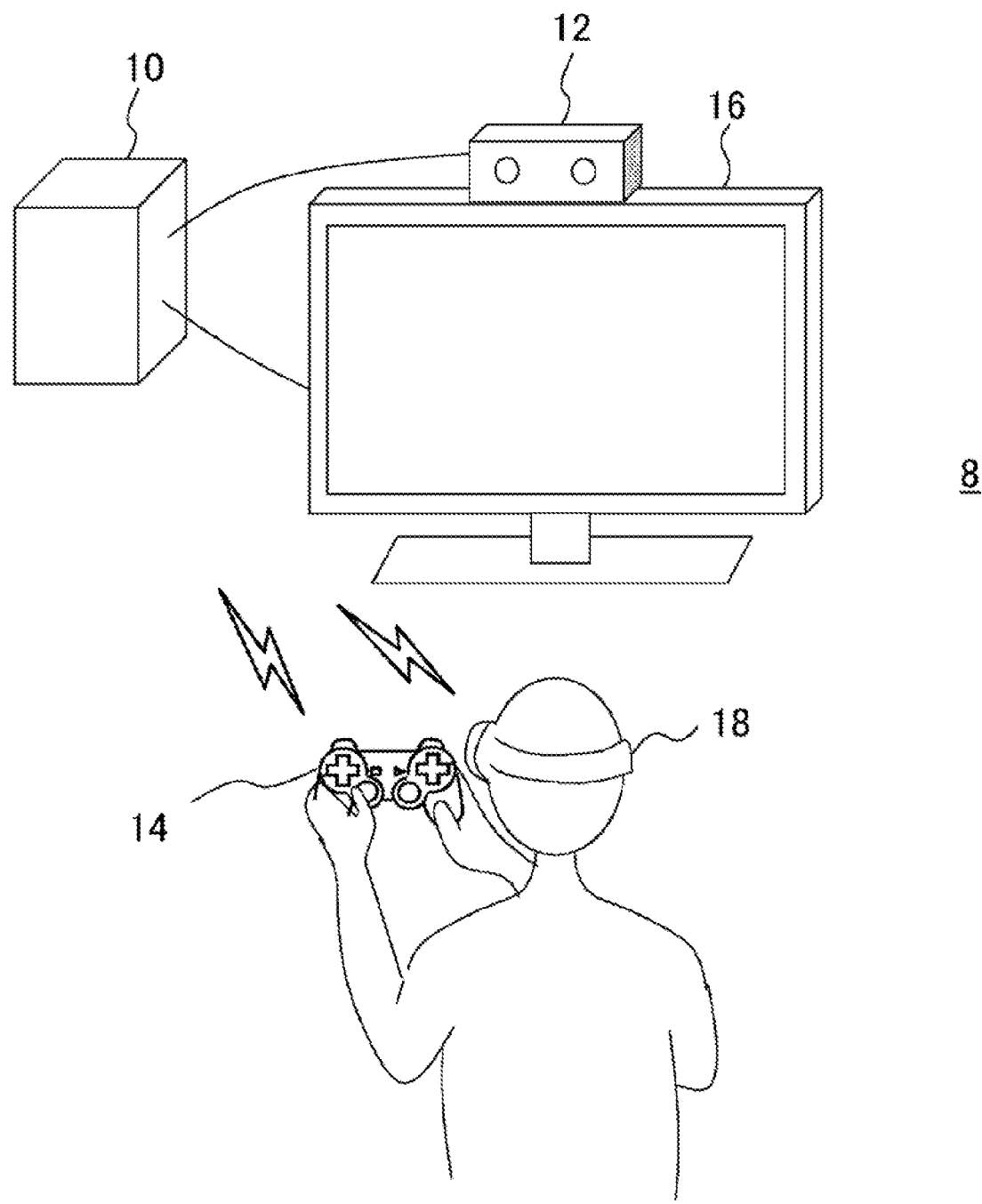
FIG. 1 is a schematic diagram depicting a typical configuration of an information processing system to which one embodiment of the present invention may be applied.

FIG. 1 depicts a typical configuration of an information processing system to which an embodiment of the present invention may be applied. An information processing system 8 includes an imaging device 12 that images the target object, an information processing apparatus 10 that performs information processing based on captured images, a flat-screen display device 16 that displays images resulting from the information processing, a head-mounted display (called the HMD hereunder) 18 that also displays such images, and an input device 14 operated by a user.

The information processing apparatus 10, the imaging device 12, the input device 14, the flat-screen display device 16, and the HMD 18 may be interconnected by cable or by known wireless communication technology such as Bluetooth (registered trademark). Depending on the information processing performed by the information processing apparatus 10, the input device 14, the flat-screen display device 16, and the HMD 18 may be selectively introduced. The external shapes of these devices are not limited to what is illustrated in the drawing. At least two of the above-mentioned devices may be integrally formed. For example, the information processing apparatus 10, the input device 14, and the flat-screen display device 16 may be formed integrally in a portable terminal.

The imaging device 12 includes a camera that images the target object such as the user at a predetermined frame rate and a mechanism that generates output data of a captured image by performing known processes such as demosaicing on the signal output from the camera, the mechanism further outputting the generated output data to the information processing apparatus 10. The camera is a stereo camera that includes common visible light sensors such as charge-coupled device (CCD) sensors or complementary metal oxide semiconductor (CMOS) sensors positioned right and left at a predetermined distance apart.

The information processing apparatus 10 generates output data such as images and sounds by performing necessary information processing using data sent from the imaging device 12. The content of the processing performed by the information processing apparatus 10 is not limited to anything specific and may be determined as needed depending on the detailed functions and applications desired by the user. For example, the information processing apparatus 10 performs known processes such as tracking on the captured image in order to advance a game featuring a character reflecting the movements of the user as the target object or to convert the user's movements into command input for information processing.

At this point, a marker mounted on the input device 14 may be used to acquire the movements of the input device 14. Also, multiple markers attached to the external surface of the HMD 18 may be tracked to determine the position and posture of the user's head on which the HMD 18 is mounted, and a virtual world viewed from a view moving with the user's head may be displayed on the HMD 18. The output data generated by the information processing apparatus 10 is transmitted to at least either the HMD 18 or the flat-screen display device 16.

The HMD 18 is a display device which, worn by the user on the head, displays images on a display screen, such as an organic electroluminescent (EL) panel, positioned in front of the user's eyes. For example, the HMD 18 generates parallax images viewed from the left and right and displays each image on the left and right screen regions making up the display screen, thus allowing the user to view a three-dimensional (3D) image. However, the substance of the present embodiment is not limited to, and a single image may be displayed on the entire display screen. The HMD 18 may further incorporate speakers or earphones that output sounds to where the user's ears are located.

The flat-screen display device 16 may be a television (TV) set that has a display for outputting two-dimensional images and speakers for outputting sounds. For example, the flat-screen display device 16 may be a liquid crystal display TV set, an organic EL TV set, a plasma display TV set, or a personal computer (PC) display. In another example, the flat-screen display device 16 may be the display of a tablet terminal or a mobile terminal with speakers. The input device 14, when operated by the user, receives requests such as those for starting and ending processes, selecting functions, and inputting commands, and outputs the received request to the information processing apparatus 10 as an electrical signal.

The input device 14 may be any one of common input devices such as a game controller, a keyboard, a mouse, a joystick, a touch pad mounted on the display surface of the flat-screen display device 16, or a combination of these devices. The input device 14 may further include a light-emitting marker having an element emitting light in a predetermined color, or an aggregate of such light-emitting elements. In this case, the information processing apparatus 10 may track the movement of the marker using captured images and interpret the movement of the input device 14 as the user's operation. As another alternative, the input device 14 may be composed of only a light-emitting marker and a mechanism for holding that marker.

Figure 2:
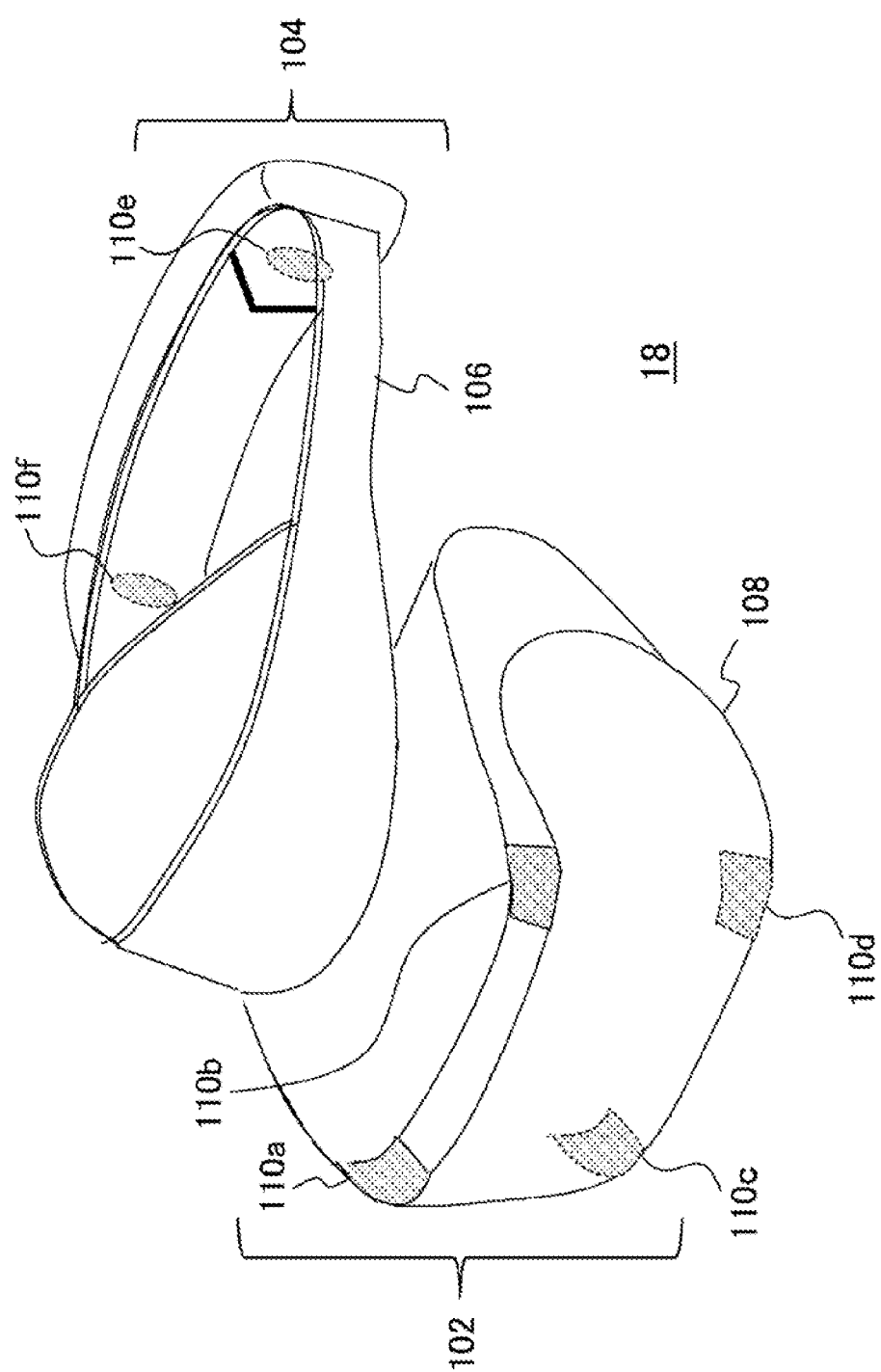
FIG. 2 is a schematic diagram depicting a typical external shape of a head-mounted display (HMD) embodying the present invention.

FIG. 2 depicts the appearance of the HMD 18. In this example, the HMD 18 is made up of an output mechanism section 102 and a wearing mechanism section 104. The wearing mechanism section 104 includes a wear band 106 worn by the user around the head to secure the device. The wear band 106 is made of a material adjustable in length to the circumference of the user's head or has such a structure. For example, the wear band 106 may be formed by an elastic body such as rubber or may employ a buckle or gear arrangement.

The output mechanism section 102 includes an enclosure 108 shaped to cover the user's right and left eyes when the HMD 18 is worn by the user. Inside the enclosure 108 is a display panel facing both eyes when the device is worn. Outside the enclosure 108 are light-emitting markers 110a, 110b, 110c, and 110d. Although the number of light-emitting markers and their locations are not limited, four light-emitting markers are arranged at the four corners of the enclosure front of the output mechanism section 102 in the illustrated example. Further, light-emitting markers 110e and 110f may also be arranged on both sides at the back of the wear band 106. The light-emitting markers 110c and 110d under the output mechanism section 102 and the light-emitting markers 110e and 110f outside the wear band 106 are not seen from the view of FIG. 5 and are thus indicated with broken lines depicting the circumferences of each marker.

With the light-emitting markers arranged as described above, when the user wearing the HMD 18 faces the imaging device 12, four light-emitting markers 110a, 110b, 110c, and 110d are captured; when the user wearing the HMD 18 is looking sideways, three light-emitting markers (e.g., 110b, 110d, and 110e) are captured; when the user wearing the HMD 18 is looking back, two light-emitting markers 110e and 110f are captured. If the user's head is oriented somewhere in between these positions, the user's head orientation would be uniquely determined by the known arrangement of the light-emitting markers on the HMD 18 in terms of the rotation angle around the user's body axis, i.e., the relationship between the yaw angle, and the apparent number of light-emitting markers and their positional relationships.

Using the above-mentioned relationship makes it possible to determine the angle of the user's head oriented in any direction around the body axis based on the number of light-emitting marker images and their positional relationships in the actually captured image. As with the yaw angle, the angle variation (pitch angle) of the user looking up or down and the angle variation (roll angle) of the user tilting the head are also determined by the number of light-emitting marker images and their positional relationships. As a result, the user's head posture is determined in all directions.

Figure 3:
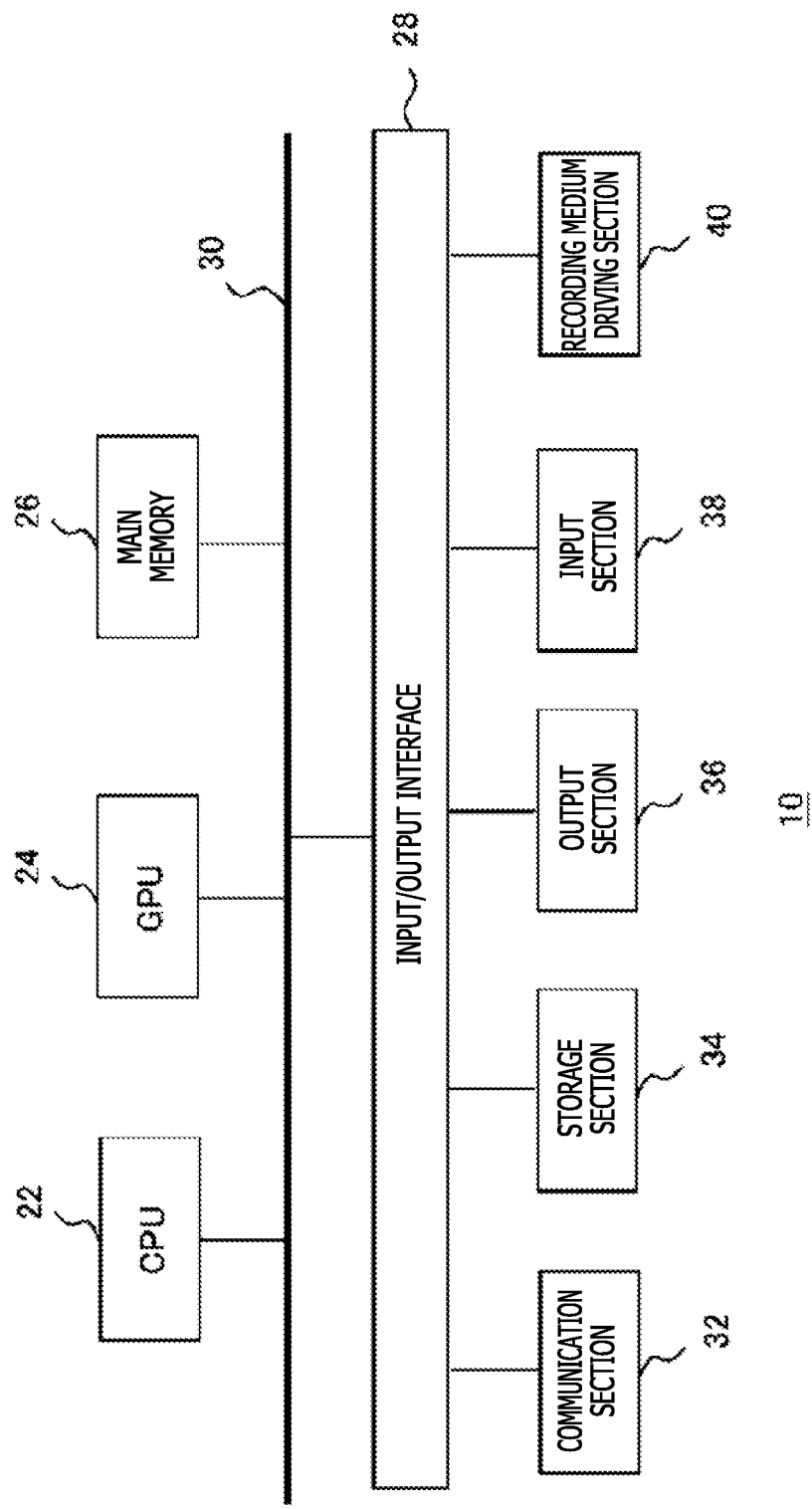
FIG. 3 is a schematic diagram depicting an internal circuit configuration of an information processing apparatus embodying the present invention.

FIG. 3 depicts an internal circuit structure of the information processing apparatus 10. The information processing apparatus 10 includes a central processing unit (CPU) 22, a GPU 24, and a main memory 26. These components are interconnected via a bus 30. The bus 30 is also connected to an input/output interface 28. The input/output interface 28 is connected to peripheral device interfaces, such as a universal serial bus (USB) interface and an Institute of Electrical and Electronics Engineers (IEEE) 1394 interface; a communication section 32 made of a wired or wireless local area network (LAN) interface; a storage section 34, such as a hard disk drive or a nonvolatile memory; an output section 36 for outputting data to the flat-screen display device 16 and the HMD 18; an input section 38 for inputting data from the imaging device 12 or the input device 14; and a recording medium driving section 40 that drives removable recording media, such as magnetic disks, optical disks, or semiconductor memories.

The CPU 22 controls the entire information processing apparatus 10 by executing the operating system stored in the storage section 34. The CPU 22 also executes various programs read from the removable recording medium and loaded into the main memory 26 or programs downloaded via the communication section 32. The GPU 24 has the function of a geometry engine and that of a rendering processor. In accordance with a rendering instruction from the CPU 22, the GPU 24 performs a rendering process and stores the resulting display image in a frame buffer (not depicted). The GPU 24 proceeds to convert the display image in the frame buffer into a video signal and output the video signal to the output section 36. The main memory 26 is composed of a random access memory (RAM) that stores the programs and data necessary for the processing.

Figure 4:
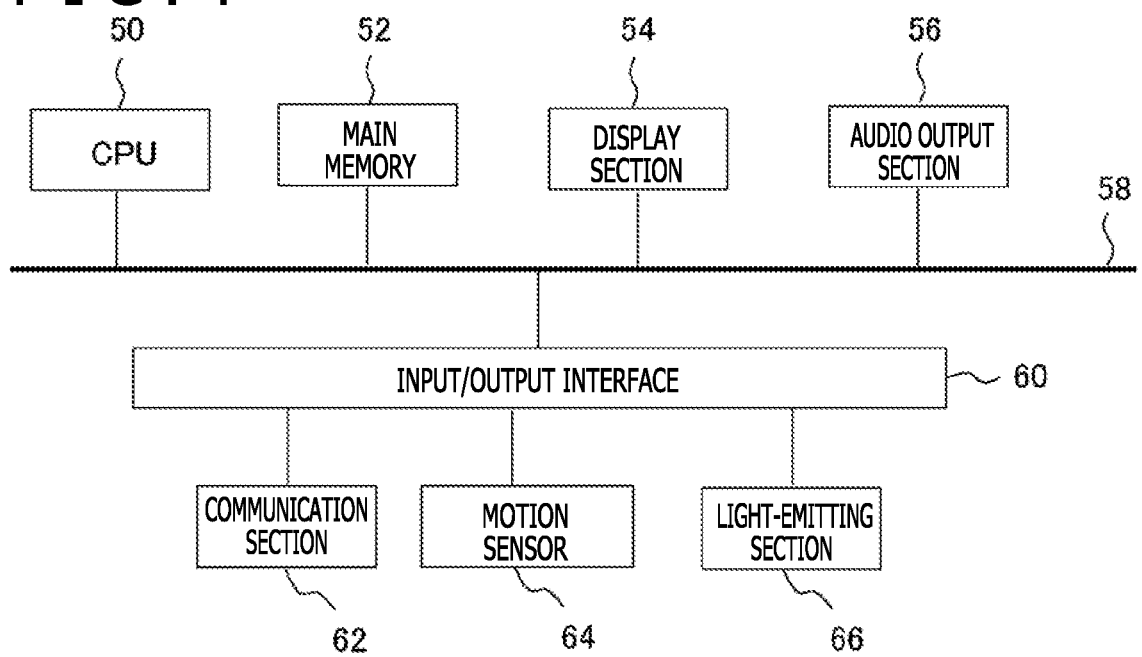
FIG. 4 is a schematic diagram depicting an internal circuit configuration of the HMD embodying the present invention.

FIG. 4 depicts an internal circuit structure of the HMD 18. The HMD 18 includes a CPU 50, a main memory 52, a display section 54, and an audio output section 56. These components are interconnected via a bus 58. The bus 58 is further connected to an input/output interface 60. The input/output interface 60 is connected to a communication section 62 made of a wired or wireless LAN network interface, a motion sensor 64, and a light-emitting section 66.

The CPU 50 processes the information acquired from the components of the HMD 18 via the bus 58 and feeds output data to the display section 54 and the audio output section 56. The main memory 52 stores the programs and data necessary for processing by the CPU 50. However, depending on the application to be executed or the design of equipment in use, the information processing apparatus 10 may carry out most of the processing, so that the HMD 18 only needs to output the data sent from the information processing apparatus 10. In this case, the CPU 50 and the main memory 52 may be replaced with simpler devices.

The display section 54 is configured with a display panel such as a liquid crystal panel or an organic EL panel that displays images in front of the eyes of the user wearing the HMD 18. As mentioned above, a stereoscopic view may be implemented by displaying a pair of parallax images in the panel regions corresponding to the right and left eyes. The display section 54 may further include a pair of lenses positioned between the display panel and the eyes of the user wearing the HMD 18, the lenses acting to expand a viewing angle of the user.

The audio output section 56 includes speakers or earphones positioned where the use's ears are located when the HMD 18 is worn by the user, allowing the user to hear sounds. The number of audio channels for output is not limited. The audio output section 56 may have monaural, stereo, or surround speakers or headphones. The communication section 62 is an interface that transmits and receives data to and from the information processing apparatus 10 and the flat-screen display device 16. For example, the communication section 62 may be implemented using known wireless communication technology such as Bluetooth (registered trademark).

The motion sensors 64 are provided through the combination of an acceleration sensor and a gyro sensor, for example, to detect the posture and movements of the HMD 18. The results of the detection are transmitted to the information processing apparatus 10 via the communication section 62. The light-emitting section 66 is an element or an aggregate of elements emitting light in a predetermined color and corresponding to the light-emitting markers 110*a* to 110*f* in FIG. 2. Multiple light-emitting elements are attached to the external surface of the HMD 18. The information processing apparatus 10 tracked as markers permit acquisition of the position of the HMD 18. Also, the posture of the HMD 18 is acquired on the basis of the number of marker images and the positional relations therebetween in the captured image.

The information processing apparatus 10 acquires the position and posture of the user's head with higher accuracy by integrating the information obtained by multiple means including the motion sensors 64 and light-emitting section 66. The information processing apparatus 10 identifies at a predetermined rate the movements of the point of view in the real world based on the acquired information, and causes the HMD 18 to display a virtual-world image seen from a point of view that moves in keeping with the real-world point of view. This allows the user to experience the sensation of almost being inside the virtual world. It is to be noted, however, that at least part of the image to be displayed need not be of the virtual world. For example, the HMD 18 may be equipped with an imaging device (not depicted) of which the visual line is aligned with the user's visual line, and an image captured by the imaging device may be displayed unmodified on the HMD 18. The image captured by the imaging device may also be overlaid with a virtual object.

The means for determining the movements of the point of view is not limited to the measurements made by the motion sensors 64 of the HMD 18 or to the images of the light-emitting section 66 in the captured image. Operations on the arrow keys of the input device 14 or images of the markers on the input device 14 may also be used as the means for determining the movements of the point of view. A technique well known as the stereoscopic imaging method involves identifying the position of a target object in a three-dimensional real world from marker images in right and left images captured by a stereo camera mounted on the imaging device 12.

Alternatively, the position of the user in the real space may be identified by other known techniques such as the time-of-flight (TOF) technique involving the use of an infrared-emitting mechanism, not depicted, and a camera that measures reflected light of the emission therefrom. As mentioned above, the device for displaying images is not limited to the HMD 18. The display device may alternatively be the flat-screen display device 16, or both the HMD 18 and the flat-screen display device 16. The flat-screen display device 16 may have a generally known structure, so that the internal mechanism of the flat-screen display device 16 will not be explained further.

Figure 5:
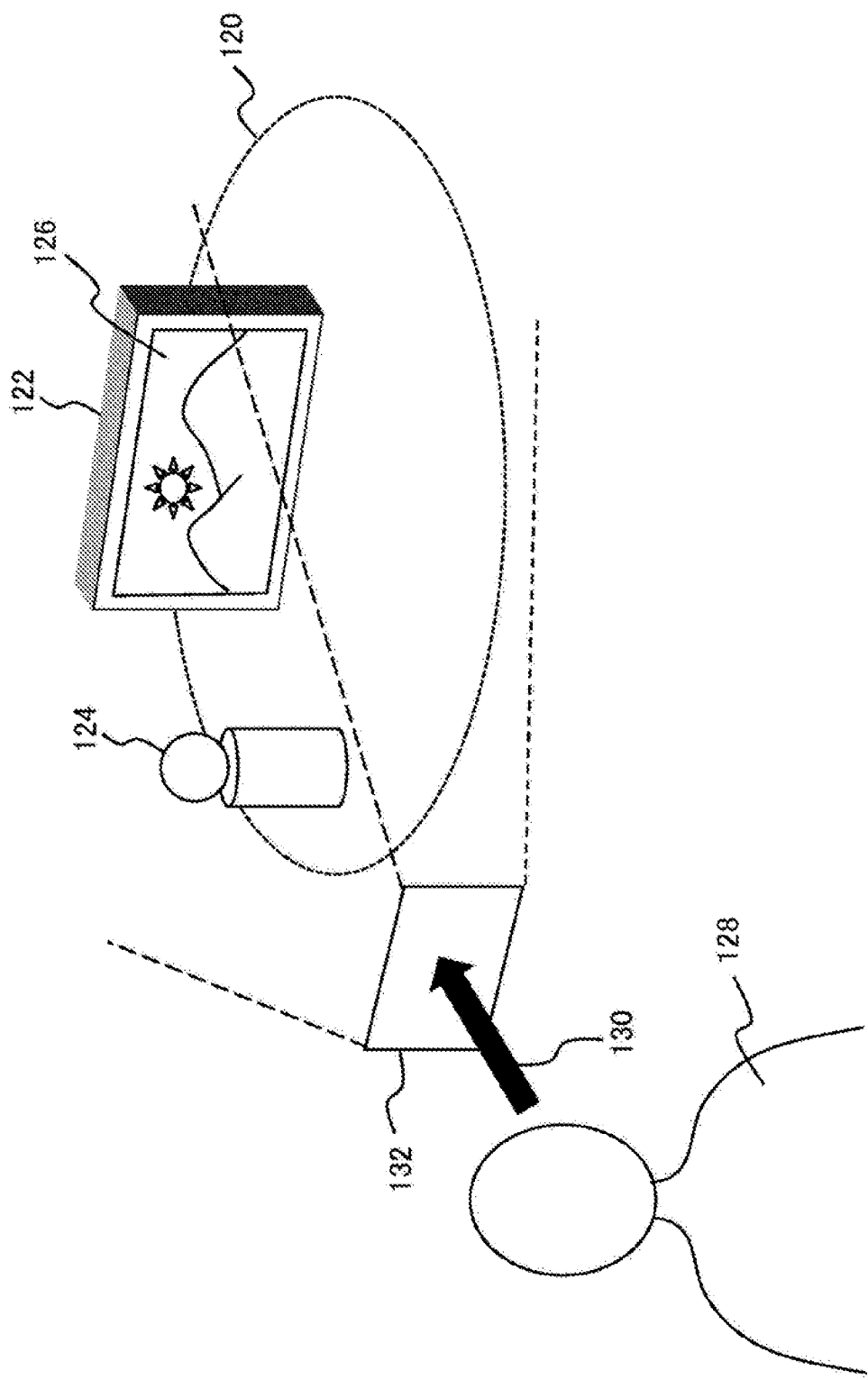
FIG. 5 is a schematic diagram illustrating a virtual world as the target to be rendered by the embodiment of the present invention.

In any case, the present embodiment displays as the image a world seen from the point of view that moves in accordance with the movements of the user or in response to operations performed by the user. FIG. 5 depicts a typical virtual world to be rendered by the present embodiment. In the example of FIG. 5, objects 122 and 124 exist in a virtual world 120. The objects 122 and 124 have their model data prepared beforehand as three-dimensional objects. For example, the object 122 may be a display device such as a television set. The object 124 may be a character that moves in response to the user's operations, for example.

A situation in which a user 128 views the virtual world 120 is generated by having the virtual world 120 projected to a screen plane 132 established in accordance with the direction of the user's visual line 130 and the position of the user 128. If a texture image representing a separately generated video is mapped to a screen 126 of the object 122, then the user 128 can enjoy the video as if he or she is watching the television in the virtual world.

The surface such as the screen 126 to which to map the texture image varies in apparent size and shape depending on the distance from the user 128 and on the angle of the visual line 130. If the texture image mapped to the screen 126 is a video, it is necessary to update the video frame by frame. At the time of projection to the screen plane 132 with the present embodiment, the values of the pixels making up the video are determined so as to reflect the updates of the video on the spot. In this manner, the apparent changes in the texture image are presented instantaneously with high picture quality.

In the paragraphs that follow, the surface of an object such as the screen 126 to which the texture image is mapped using the technique of the present embodiment will be referred to as "mapping target surface." The texture image to which the present embodiment is applicable is not limited to videos. The target to which to map the texture image is not limited to what is illustrated in the drawing. For example, the target may be any surface such as that of the object 124. Because the mapping technique of the present embodiment can coexist with existing mapping techniques, these techniques may be selectively utilized depending on the characteristics of the object and texture image or on the situation involved.

Figure 6:
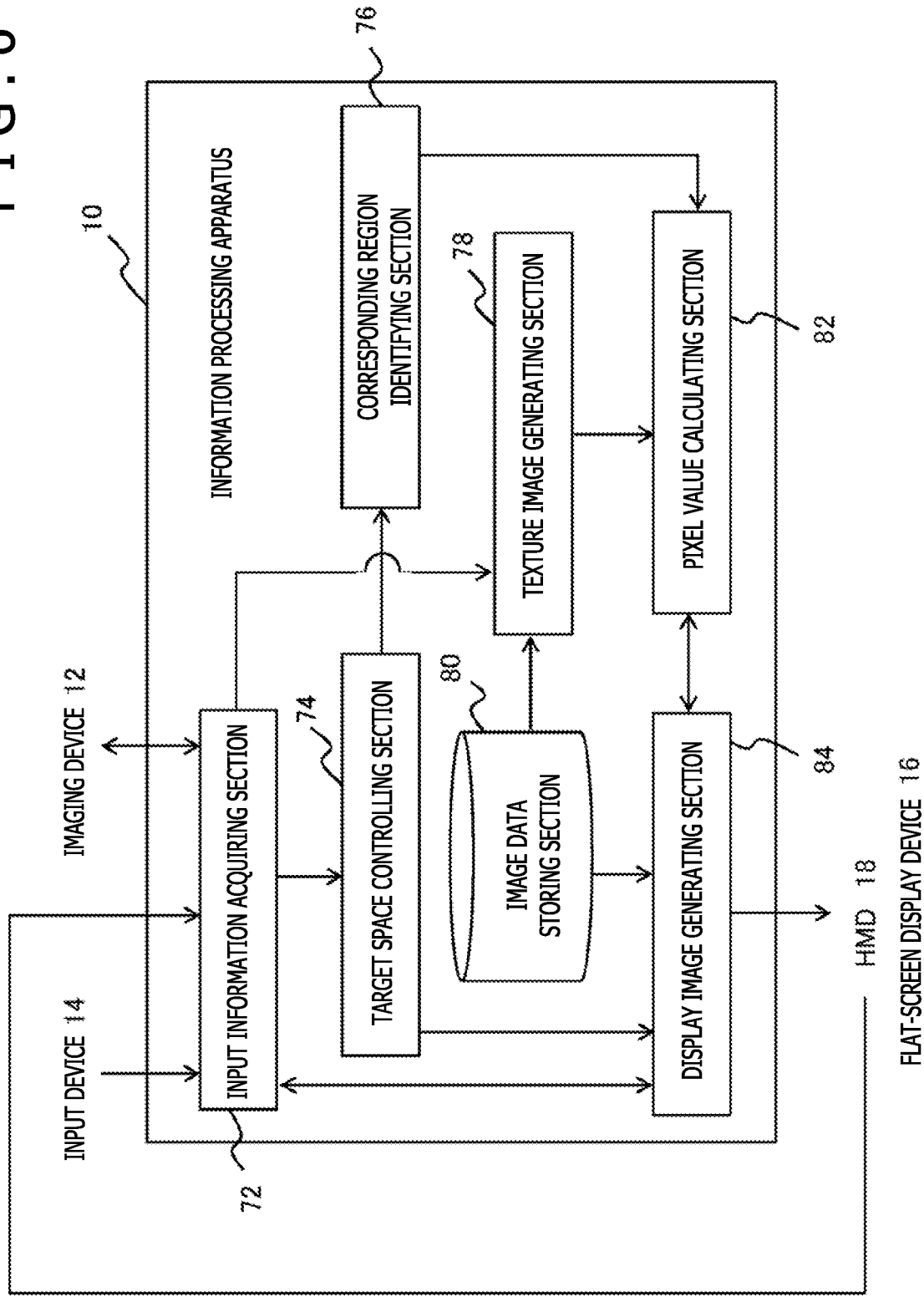
FIG. 6 is a block diagram depicting a functional block structure of the information processing apparatus embodying the present invention.

FIG. 6 depicts a functional block structure of the information processing apparatus 10 in the present embodiment. The functional blocks depicted in FIG. 6 may be implemented in a hardware configuration that may include a CPU 22, a GPU 24, a main memory 26, an output section 36, and an input section 38 depicted in FIG. 3. These functional blocks may also be implemented in software such as programs that are loaded typically from a recording medium into the main memory 26 to provide a data input function, a data holding function, an arithmetic function, an image processing function, and a communication function, for example. Thus it will be understood by those skilled in the art that these functional blocks are realized by hardware alone, by software alone, or by a combination of both in diverse forms and are not limited to any of such forms.

The information processing apparatus 10 includes an input information acquiring section 72 that acquires information input from the imaging device 12, the input device 14, and the HMD 18, a target space controlling section 74 that controls positional relations between the screen plane and a target space for rendering in accordance with the user's visual line, a corresponding region identifying section 76 that identifies a region in a texture image corresponding to each pixel on the screen plane, a texture image generating section 78 that generates the texture image, a pixel value calculating section 82 that calculates the pixel value of the region on the screen plane to which to map the texture image, a display image generating section 84 that generates an entire image to be displayed, and an image data storing section 80 that stores various data such as texture image data and object model data necessary for generating the display image.

The input information acquiring section 72 acquires the content of user operations from the input device 14. The user operations may include selection of the content of information processing to be executed, starting and ending of the processing, input of commands regarding the ongoing information processing, and other operations commonly performed during information processing. Depending on the type of the content of the acquired user operation, the input information acquiring section 72 feeds the operational content at least to the target space acquiring section 74, to the texture image generating section 78, or to the display image generating section 84.

The input information acquiring section 72 further acquires captured image data from the imaging device 12 and measurements made by the motion sensors 64 in the HMD 18, and feeds the acquired data and measurements to the target space controlling section 74. Also, the input information acquiring section 72 may perform control to start or end imaging by the imaging device 12 in accordance with a processing start or end request from the user. Depending on the result of the processing by the display image generating section 84, the input information acquiring section 72 may further control the type of data to be acquired from the imaging device 12.

The target space controlling section 74 identifies the position and movements of the HMD 18 based on the image positions of the markers on the HMD 18 in the captured image and on the inclination and angular velocity of the HMD 18 measured by the motion sensors 64. As depicted in FIG. 5, the target space controlling section 74 sets the screen plane 132 in a position and a direction corresponding to the position and visual line of the user. In practice, this is the process of establishing a screen coordinate system with respect to a world coordinate system that defines the virtual world.

The virtual world 120 is established separately in accordance with the content of information processing such as a video game selected by the user and in keeping with the progress of the information processing. Existing techniques of computer graphics may be used in carrying out the process of placing objects into the virtual world 120 and of transforming local coordinate systems defining the individual objects to the world coordinate system.

Given that region of the screen plane 132 in which the image on the mapping target surface appears, the corresponding region identifying section 76 identifies the correspondence between each pixel included in the region and a region in the texture image. The farther the mapping target surface is from the screen plane 132, the smaller the texture image appears to be in size. Hence the increasing number of texture image pixels (texels) corresponding to one pixel on the screen plane 132. Basically with the present embodiment, an average of the values sampled by a predetermined rule from the texels included in the identified region is acquired as a pixel value for the screen plane 132. At this time, the number and the distribution of sampling points are controlled in consideration of the distance and the angle between the screen plane 132 and the mapping target surface. In this manner, a suitable pixel value reflecting both the distance and the angle at the same time is determined. A specific example of this aspect will be explained later.

The texture image generating section 78 generates the texture image using the data stored in the image data storing section 80. The texture image generated here is a common video or still image. For example, if compression-coded video data is held in the image data storing section 80, the texture image generating section 78 decompresses the data retrieved therefrom into the original frame sequence. In the case of a still image, common texture image data may simply be read from the image data storing section 80.

The source from which to read the texture data is not limited to an internal storage device of the information processing apparatus 10. For example, a video streamed from a server over a network may be used as the texture image. If the texture image is a video, the selection of the video and the start and stop of its reproduction may be carried out by the user operating the input device 14, or determined internally by the information processing apparatus 10 in accordance with the content of information processing such as a video game and the progress of the information processing. In the former case, the objective may be for the user to appreciate the video itself. There may be staged a particular situation in which a desired television program or video is displayed on a television set in the virtual world so that the television program or video may be enjoyed from a freely established point of view.

The pixel value calculating section 82 samples the texels included in the region of the texture image identified by the corresponding region identifying section 76 so as to determine the pixel value of the region on the screen plane 132 in which the image on the mapping target surface appears. The corresponding region identifying section 76 and the pixel value calculating section 82 may be separately provided as an image processing apparatus that performs texture mapping with the present embodiment, apart from the information processing apparatus 10 that executes video games and other processes.

The display image generating section 84 determines or acquires the pixel vales of all pixels making up the screen plane 132, and outputs the values as an ultimate display image to at least either the HMD 18 or the flat-screen display device 16. That is, the display image generating section 84 determines the pixel values of the entire display image by acquiring the pixel values calculated by the pixel value calculating section 82 with regard to the regions in which to form the image on the mapping target surface.

If the determination and the output of the pixel values including what is sampled of the texture image are performed parallelly in a predetermined sequence of pixels such as in order of raster scan, a display image reflecting the movements of the point of view is displayed instantaneously. The display image generating section 84 may not only change the display image in a manner reflecting the moving point of view but also let the game progress or perform diverse information processing in accordance with the operations by or the movement of the user, so as to get the result of the processing reflected on the display image. Furthermore, the display image generating section 84 may generate and output audio data as needed.

Figure 7:
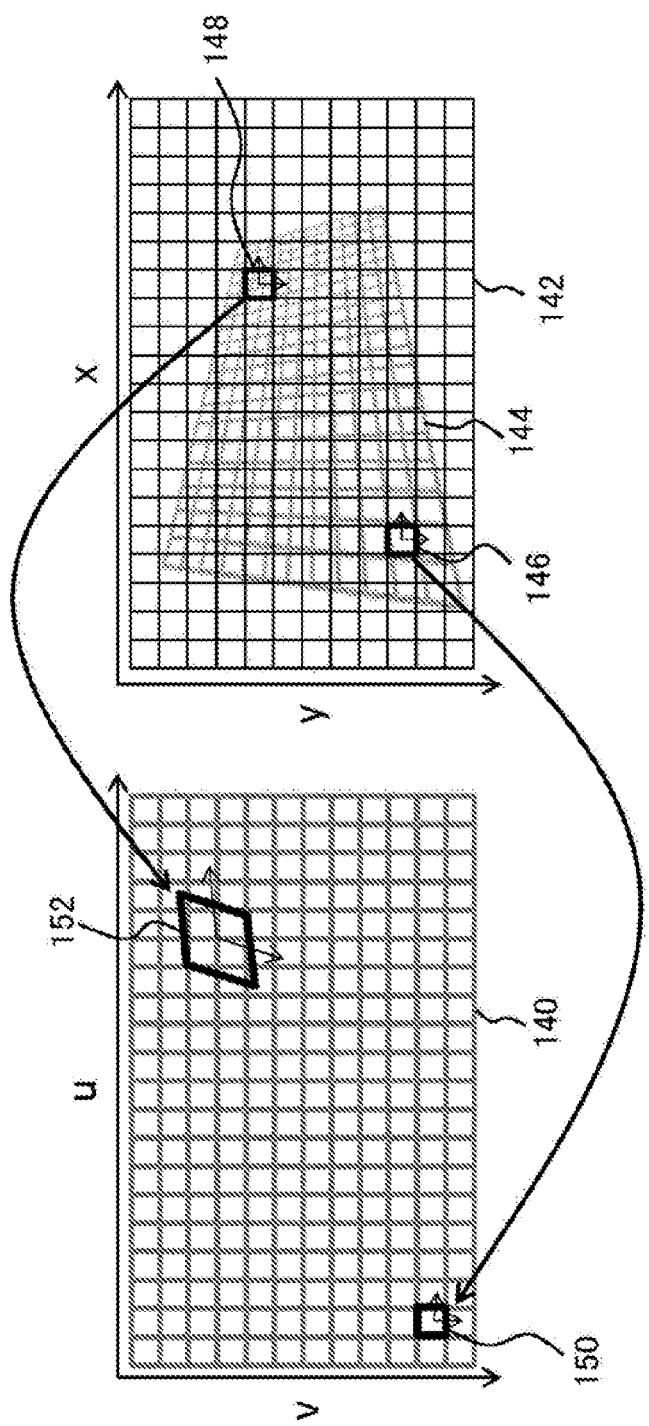
FIG. 7 is a schematic diagram illustrating corresponding relations between pixels of a screen plane and regions in a texture image, the relations being identified by a corresponding region identifying section of the embodiment.

FIG. 7 illustrates corresponding relations between pixels of the screen plane and regions in the texture image, the relations being identified by the corresponding region identifying section 76. In the drawing, a texture image plane 140 is depicted on the left and a screen plane 142 is on the right. Both planes are latticed, and each square block in the lattice is the smallest unit of each plane representing a pixel. As illustrated, the texture image plane 140 has a horizontal u-axis and a vertical v-axis extending from the top left corner of the plane as the origin. The screen plane 142 has a horizontal x-axis and a vertical y-axis extending also from the top left corner of the plane as the origin. An image on a mapping target surface 144 takes up regions of the screen plane 142 as illustrated.

If the mapping target surface 144 is not in parallel with the screen plane 142 as illustrated, the number of texels corresponding to one pixel of the screen plane 142 varies depending on the position on the mapping target surface 144. For example, a pixel 146 corresponds approximately to one texel, whereas a pixel 148 corresponds to four or more texels. Texture image regions included in the pixels 146 and 148 of the screen plane 142 are approximated by regions 150 and 152 on the texture image plane 140, individually.

With the present embodiment, as described above, where a display image defined on the screen plane 142 is to be rendered, the pixel values of the pixels 148 and 146 are suitably determined by directly sampling the values of the texels in the corresponding regions 152 and 150 on the texture image plane 140. At this time, if multiple texels are involved as in the region 152, the number and the distribution of sampling points are first adjusted in accordance with the size and shape of the region 152. An average of the sampled values is then acquired to efficiently calculate the pixel value suitably reflecting the position and angle of the mapping target surface 144.

The mapping target surface 144 is formed by mapping the texture image plane 140 to a virtual space. It follows that common coordinate transformations may be used to identify how a given position in the coordinate system of the texture image plane 140 corresponds to a particular position in the coordinate system of the screen plane 142. Although the regions (e.g., regions 150 and 152) on the texture image plane 140 corresponding to specific pixels (e.g., pixels 146 and 148) on the screen plane 142 may be obtained by inversing the above coordinate transformations, the present embodiment expedites the processing through linear approximation using partial differential.

First, a function f(x, y) for transforming the coordinates (x, y) on the screen plane 142 to the corresponding coordinates (u, v) on the texture image plane 140 is defined as follows:

$$\begin{bmatrix} u \\ v \end{bmatrix} = f(x, y) = \begin{bmatrix} f1(x, y) \\ f2(x, y) \end{bmatrix} \quad \text{[Math. 1]}$$

The Taylor expansion of a function f1 at positions distanced by ±d in the x-axis direction from given position coordinates ($x_0$, $y_0$) on the screen plane 142 is as follows:

$$f1(x_0 + d, y) = \quad \text{[Math. 2]}$$
$$f1(x_0, y_0) + \frac{\partial f1(x_0, y_0)}{\partial x} \cdot d + \frac{1}{2} \frac{\partial^2 f1(x_0, y_0)}{\partial x^2} \cdot d^2 + O(d^3)$$
$$f1(x_0 - d, y) = f1(x_0, y_0) - \frac{\partial f1(x_0, y_0)}{\partial x} \cdot d +$$

-continued
$$\frac{1}{2} \frac{\partial^2 f1(x_0, y_0)}{\partial x^2} \cdot d^2 + O(d^3)$$

The difference between the two equations above is given by the following expression:

$$\frac{f1(x_0 + d, y) - f1(x_0 - d, y)}{2d} = \frac{\partial f1(x_0, y_0)}{\partial x} + O(d^2) \quad \text{[Math. 3]}$$

Likewise, when consideration is made of the Taylor expansion of the function f1 at positions distanced by ±d in the y-axis direction from the position coordinates ($x_0$, $y_0$) and of the Taylor expansion of a function f2 at positions distanced by ±d in the y-axis direction from the position coordinates ($x_0$, $y_0$), the position coordinates (u, v) on the texture image plane 140 corresponding to the position coordinates (x, y) distanced by (Δx, Δy) from the position coordinates ($x_0$, $y_0$) on the screen plane 142 are approximated as follows:

$$\begin{bmatrix} u \\ v \end{bmatrix} = \begin{bmatrix} u_0 \\ v_0 \end{bmatrix} + A \begin{bmatrix} \Delta x \\ \Delta y \end{bmatrix} \quad \text{[Math. 4]}$$

$$A = \begin{bmatrix} a_{11} & a_{12} \\ a_{21} & a_{22} \end{bmatrix}$$

In the above expression, coordinates ($u_0$, $v_0$) are the position coordinates on the texture image plane 140 corresponding to the position coordinates ($x_0$, $y_0$) on the screen plane 142. Elements $a_{11}$, $a_{12}$, $a_{21}$, and $a_{22}$ in a matrix A are defined as follows:

$$a_{11} = \frac{\partial f1(x_0, y_0)}{\partial x} + O(d^2) \quad \text{[Math. 5]}$$
$$a_{12} = \frac{\partial f1(x_0, y_0)}{\partial y} + O(d^2)$$
$$a_{21} = \frac{\partial f2(x_0, y_0)}{\partial x} + O(d^2)$$
$$a_{22} = \frac{\partial f2(x_0, y_0)}{\partial y} + O(d^2)$$

According to the above transformation equations, one square region representing one pixel on the screen plane 142 is made to correspond to a parallelogram region on the texture image plane 140 of which the sides are in the directions of vectors $t_u(a^{11}, a_{21})$ and $t_v(a_{12}, a_{22})$ whose components are the columns of the matrix A.

Figure 8:
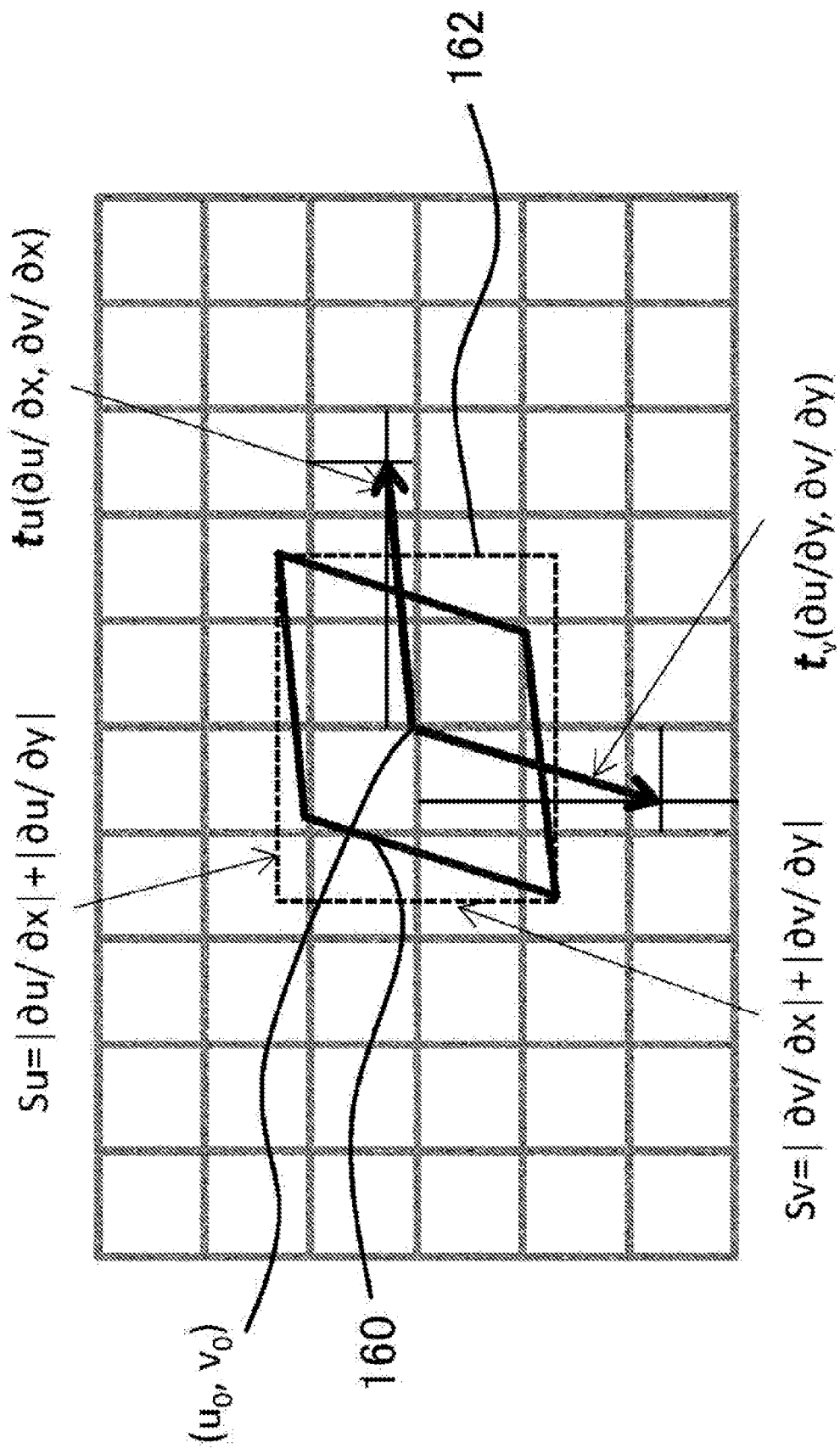
FIG. 8 is a schematic diagram illustrating a parallelogram on a texture image plane, the parallelogram being determined using transformation equations of the embodiment.

FIG. 8 illustrates a parallelogram on a texture image plane, the parallelogram being determined using the above transformation equations. The drawing depicts the region 152 and its nearby regions on the texture image plane 140 illustrated in FIG. 7. A parallelogram 160 corresponds to the region 152. The position coordinates ($u_0$, $v_0$) of the center of the parallelogram 160 correspond to the center position coordinates ($x_0$, $y_0$) of the original pixel 148 on the screen plane. The function f1 and the function f2 for the center position coordinates ($u_0$, $v_0$) of the parallelogram 160 are represented by u and v, respectively.

As described above, the parallelogram 160 has its sides positioned in parallel with the vectors $t_u(a_{11}, a_{21})$=(∂u/∂x, ∂v/∂x) and $t_v(a_{12}, a_{22})$=(∂u/∂y, ∂v/∂y). If the horizontal and vertical sides of one pixel region on the screen plane are each assumed to be 1 in length, then the horizontal side length Su and the vertical side length Sv of a rectangle 162 circumscribing the parallelogram 160 are given as the sums of the components of the vector $t_u$ and $t_v$, i.e., Su=|∂u/∂x|+|∂u/∂| and Sv=|∂v/∂x|+|∂v/∂y|, respectively. That is, the parallelogram 160 is uniquely defined by calculating the partial differential of u and v in the position coordinates ($u_0$, $v_0$). Such partial differential calculations are standard in computer graphics processing.

With the present embodiment, as described above, the number of texels to be sampled from inside the parallelogram 160 on the texture image plane corresponding to one pixel on the screen plane is adjusted in accordance with the size of the parallelogram 160 so that the texel values in the parallelogram 160 may be evenly sampled. An average of the sampled texel values is determined as the pixel value of the original pixel. FIG. 9 schematically depicts how the number of sampling points and their distribution are typically changed in accordance with the size of the parallelogram.

It is assumed here that the horizontal and vertical side lengths of one texel region in the texture image are each 1. First of all, if the horizontal side length Su and the vertical side length Sv of the circumscribing rectangle are each smaller than 1.0 as depicted under condition (a) in FIG. 9, the parallelogram contains only one texel, so that the value of this texel is acquired. That is, there is only one sampling point as indicated by a solid black circle. If, as depicted under condition (b), the longer of the two side lengths Su and Sv of the circumscribing rectangle is at least 1.0 and less than 4.0, then four points inside the parallelogram are sampled. That is, the texel values are acquired from the sampling points indicated by solid black circles. An average of the sampled texel values is obtained and is determined to be the pixel value.

Although the subfigure explanatory of the condition (b) depicts only a maximum-size parallelogram meeting the condition (b), i.e., a square of Su=SV=4, there may be diverse parallelograms meeting this condition, as will be explained later. Such diverse parallelograms have different sampling point distributions. The same applies to parallelograms under other conditions. If, as depicted under condition (c), the longer of the two side lengths Su and Sv of the circumscribing rectangle is at least 4.0 and less than 6.0, then nine points inside the parallelogram are sampled. If, as depicted under condition (d), the longer of the two side lengths Su and Sv of the circumscribing rectangle is at least 6.0 and less than 8.0, then 16 points inside the parallelogram are sampled.

Thereafter, suitable rules may be established likewise to determine the number of sampling points and their distribution in accordance with the size of the circumscribing parallelogram. This makes it possible to determine the pixel value by similar calculations regardless of the position or angle of the mapping target surface. On the other hand, if size reduction is needed more than the illustrated examples, a different reduction method may be selected in consideration of the processing load for sampling. The conditions for changing the number of sampling points and the sampling point counts are not limited to those depicted in the drawing. As mentioned above, the illustrated examples are each a square, so that their sampling points are distributed at equal distances apart in the horizontal and vertical directions. With such cases also taken into account, the rules for determining the distribution of sampling points in a given parallelogram are prepared.

Figure 10:
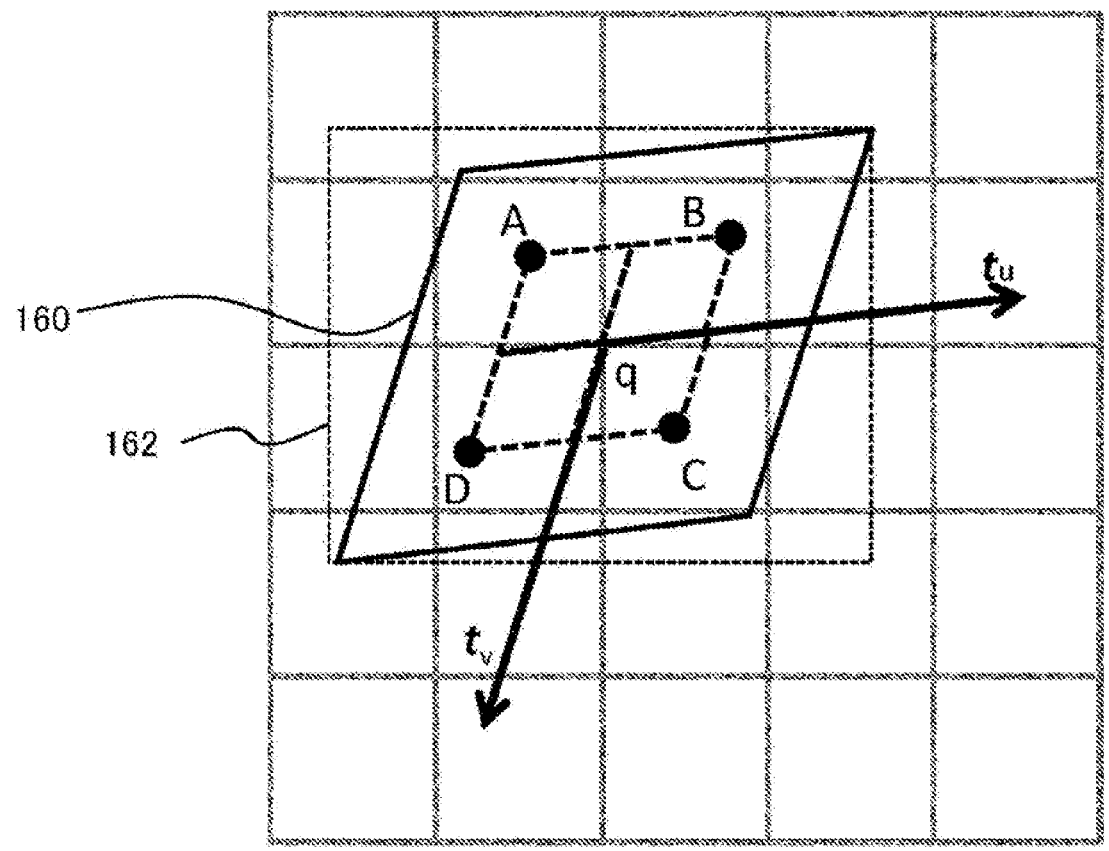
FIG. 10 is a schematic diagram explaining the rule for determining four sampling points to be sampled by the embodiment.

FIG. 10 is a schematic diagram explaining the rule for determining four sampling points to be sampled as defined by the condition (b) in FIG. 9. The parallelogram in FIG. 10 corresponds to the parallelogram 160 depicted in FIG. 8. The circumscribing rectangle 162 of the parallelogram 160 meets the condition (b) in FIG. 9, so that there are four sampling points. In this case, the vertexes A, B, C, and D of a parallelogram having the same center coordinates ($u_0$, $v_0$) as the parallelogram 160 and halved in size compared therewith in the horizontal and vertical directions are defined as the sampling points. If the center coordinates ($u_0$, $v_0$) are represented by q, then the sampling points A, B, C, and D are expressed using the vectors $t_u$ and $t_v$ as follows:

$A = q - ¼t_u - ¼t_v$ $B = q + ¼t_u - ¼t_v$ $C = q + ¼t_u + ¼t_v$ $D = q - ¼t_u + ¼t_v$ [Math. 6]

Figure 11:
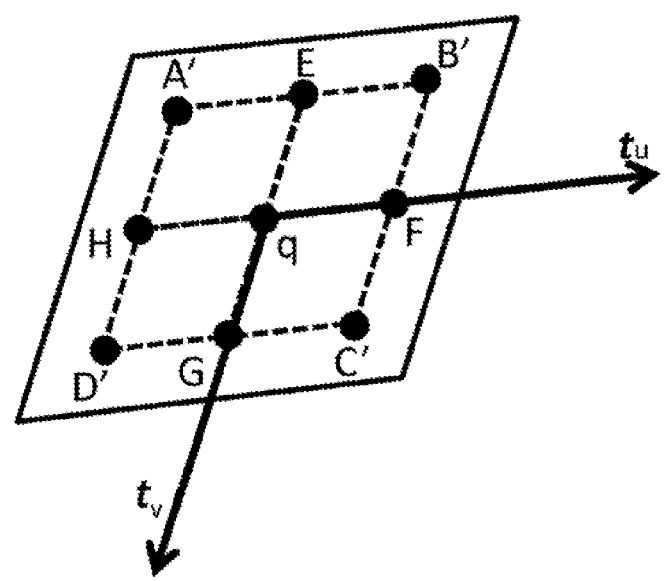
FIG. 11 is a schematic diagram explaining the rule for determining nine sampling points to be sampled by the embodiment.

FIG. 11 is a schematic diagram explaining the rule for determining nine sampling points to be sampled as defined by the condition (c) in FIG. 9. In this case, the nine sampling points are made up of points A' to D' obtained by similar calculations to those for obtaining the four sampling points A to D in FIG. 10, midpoints E, F, G, and H between two adjacent points among the four sampling points, and the center q. It is to be noted that the points A' to D' are calculated by substituting ⅓ for the coefficient of the vectors $t_u$ and $t_v$ in the above equations for calculating the points A to D. That is, the nine sampling points are defined as q, q±⅓·$t_u$±⅓·$t_v$, q±⅓·$t_u$, q±⅓·$t_v$.

Figure 12:
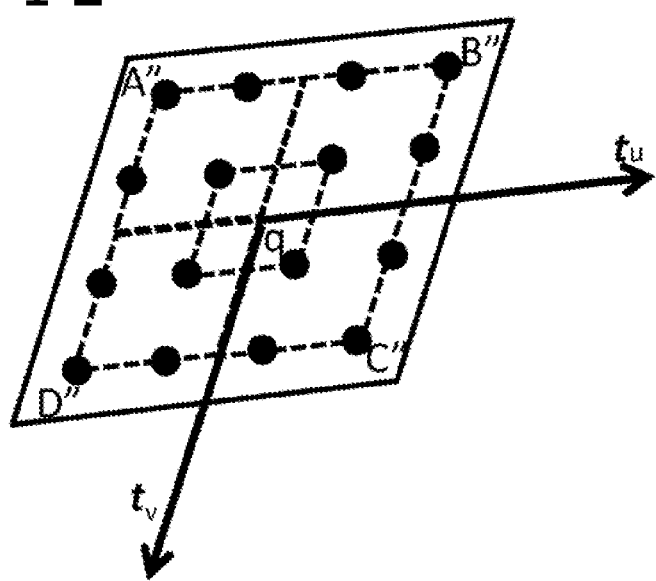
FIG. 12 is a schematic diagram explaining the rule for determining 16 sampling points to be sampled by the embodiment.

FIG. 12 is a schematic diagram explaining the rule for determining 16 sampling points to be sampled as defined by the condition (d) in FIG. 9. In this case, the 16 sampling points are made up of points A" to D" obtained by similar calculations to those for obtaining the four sampling points A to D in FIG. 10, eight points each internally dividing a segment between two adjacent points among the points A" to D" by a ratio of 1:2 and 2:1, and four points each internally dividing a segment between two adjacent points among the eight points by a ratio of 1:2 and 2:1 in either of the directions of the vectors $t_u$ and $t_v$. It is to be noted that the points A" to D" are calculated by substituting ⅜ for the coefficient of the vectors $t_u$ and $t_v$ in the above equations for calculating the points A to D. That is, the 16 sampling points are defined as q±⅜·$t_u$±⅜·$t_v$, q±³⁄₁₆·$t_u$±⅜·$t_v$, q±⅜·$t_u$±³⁄₁₆·$t_v$, q±³⁄₁₆·$t_u$±³⁄₁₆·$t_v$.

The coefficient α of the vectors $t_u$ and $t_v$ for determining the four points such as the sampling points A to D that are closest to the vertexes of the parallelogram is generalized as indicated below if the maximum-size circumscribing rectangle meeting the conditions in FIG. 9 has its sides defined as 2N (N=2, 3, 4, . . . ) in size.

$α = (N-1)/2N$

If such rules are established to determine the number of sampling points and their distribution in keeping with the size of the parallelogram, it is possible to sample points that are distributed evenly inside the parallelogram. This sampling process is performed efficiently using an existing bilinear sampling circuit. However, this is not limitative of the specific rules for sampling with the present embodiment.

Figure 13:
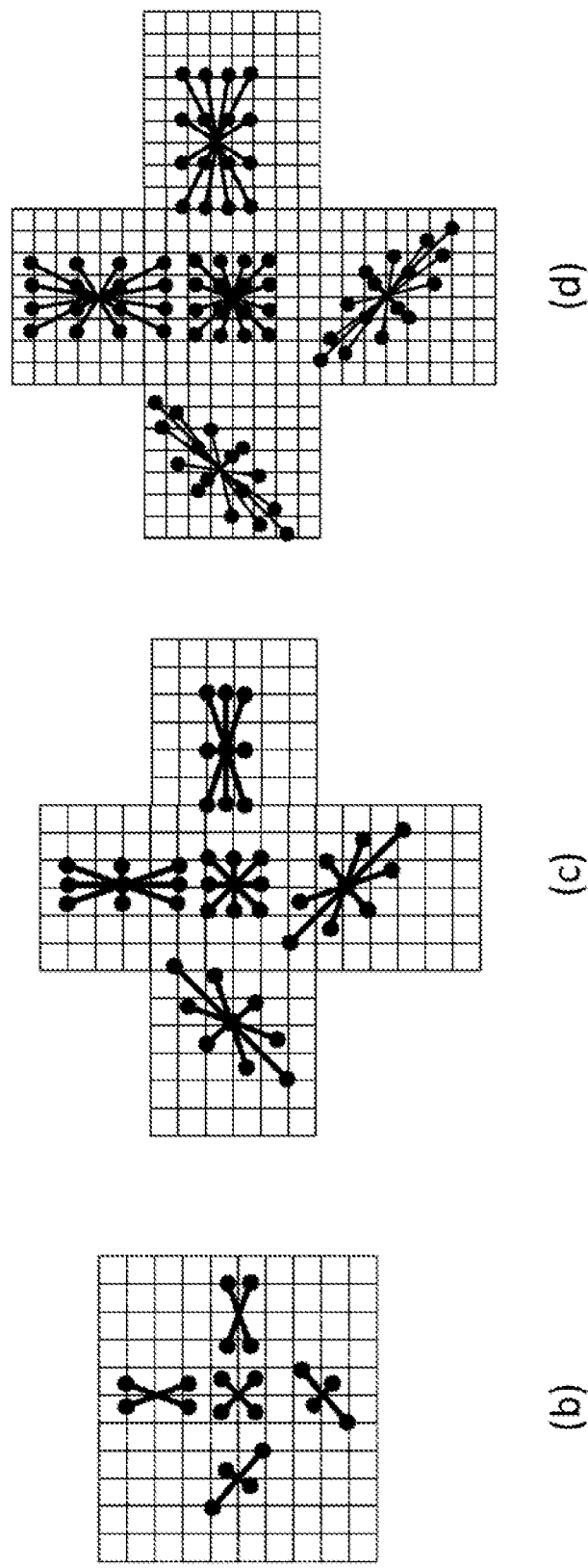
FIG. 13 is a schematic diagram depicting distributions of sampling points on the assumption of diverse positions and angles of a mapping target surface with the embodiment.

FIG. 13 schematically depicts distributions of sampling points on the assumption of diverse positions and angles of the mapping target surface. From left to right in FIG. 13, the sampling points applicable to the conditions (b), (c), and (d)

depicted in FIG. 9 are indicated by solid black circles. The segments connecting the sampling points intersect with one another at the center of the parallelogram, i.e., at the position corresponding to the center of the pixel of interest on the screen plane. As illustrated, even under the same condition, i.e., given more or less the same reduction rate, the distribution of sampling points can be varied adaptively in accordance with the shape of the parallelogram, i.e., as per the angle of the mapping target surface. Under a different condition, i.e., given a different reduction rate, the number of sampling points can be changed appropriately. These detailed rules allow the display image to be rendered solely by sampling on the spot.

Figure 14:
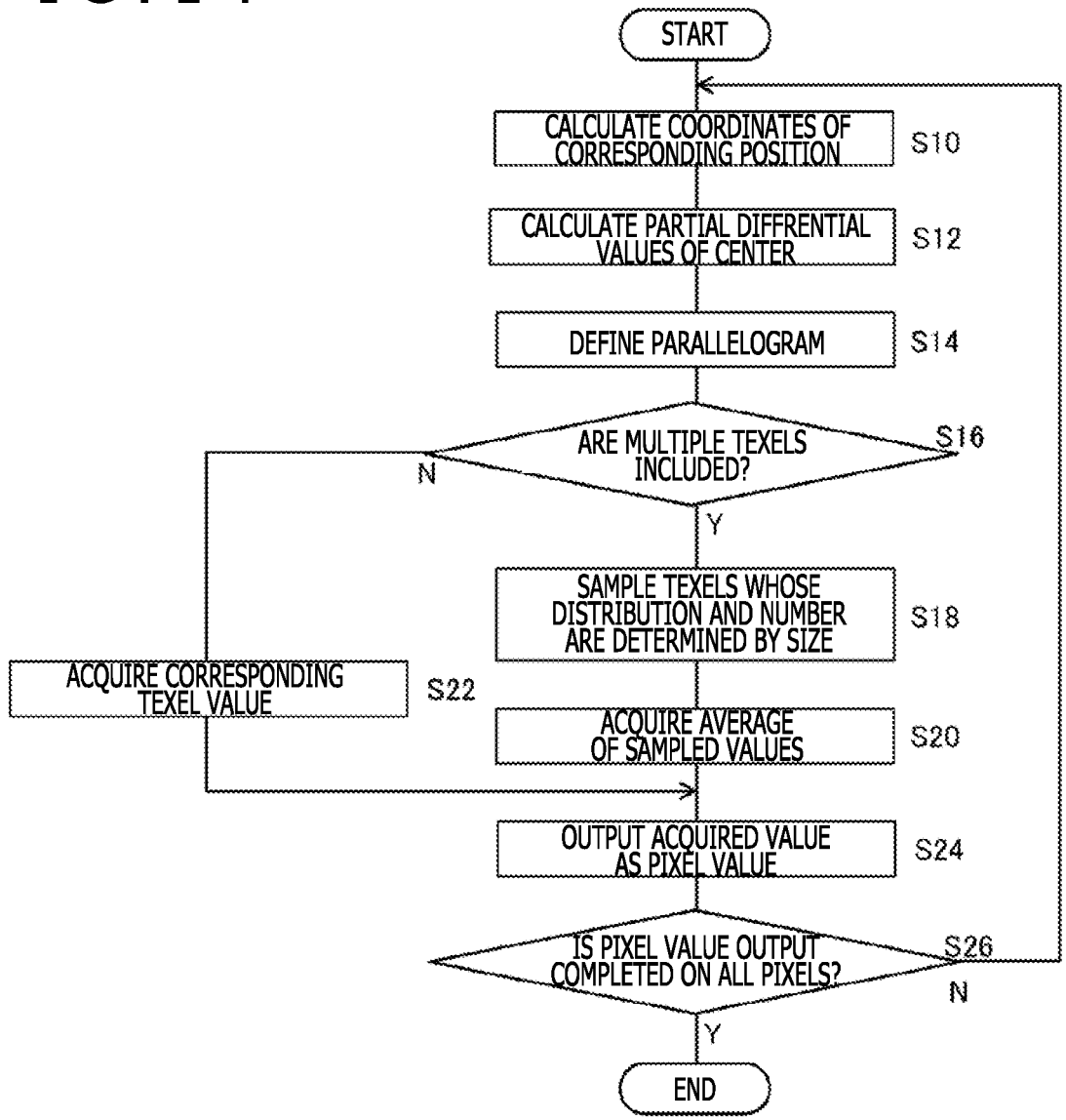
FIG. 14 is a flowchart depicting a procedure by which the information processing apparatus embodying the present invention determines the value of each of the pixels making up an image on the mapping target surface.

The operation of the information processing apparatus configured as described above is explained below. FIG. 14 is a flowchart depicting a procedure by which the information processing apparatus 10 in the present embodiment determines the value of each of the pixels making up the image on the mapping target surface. The procedure of this flowchart is started when the pixel value of a region in the image on the mapping target surface is determined during rendering of one frame of the display image that varies with the movements of the point of view for the virtual world. That is, the position information related to the pixel of interest on the screen plane is a given. If the texture image is a video, the frame image is assumed to be generated parallelly by the texture image generating section 78.

At this time, the corresponding region identifying section 76 identifies the position coordinates $(u_0, v_0)$ on the texture image plane that correspond to the center coordinates $(x_0, y_0)$ of the pixel of interest (S10). The corresponding region identifying section 76 then calculates the partial differential values of u and v in the identified position coordinates $(u_0, v_0)$ (S12). These calculations are implemented using common techniques based on the positional relations between the mapping target surface in the virtual world and the point of view. Next, the corresponding region identifying section 76 defines a parallelogram on the texture image plane in such a manner that the parallelogram corresponds to the original pixel based on the partial differential values (S14). In practice, as depicted in FIG. 8, the definition involves determining two vectors in parallel with the sides of the parallelogram and the size of a rectangle circumscribing the parallelogram. The corresponding region identifying section 76 feeds the information to the pixel value calculating section 82.

The pixel value calculating section 82 matches the actual values against the conditions for the size of the circumscribing rectangle depicted in FIG. 9, and causes the subsequent processing to branch in accordance with the result of the matching. Specifically, if only one texel is included in the circumscribing rectangle, and in the parallelogram as in the case of the condition (a) (N in S16), the value of that texel is acquired (S22). On the other hand, if multiple texels are included (Y in S16), then the actual values are matched against the conditions (b) to (d) in FIG. 9; the number of sampling points and their distribution are determined by the rule corresponding to the applicable condition; and the texel values involved are sampled (S18). An average of the sampled texel values is then calculated (S20).

The pixel value calculating section 82 outputs the value acquired in S22 or in S20 as the pixel value of the original pixel (S24). In practice, the pixel value is output in association with the position information related to the original pixel. This allows the display image generating section 84 to output the pixel value to the HMD 18, for example, together with the pixel values of the other regions at a suitable timing.

If pixel value output is not complete on all pixels on the screen plane making up the regions of the image on the mapping target surface (N in S26), the processes of S10 to S24 are repeated. If pixel value output is completed on all pixels, the process is terminated (Y in S26). The procedure depicted in FIG. 14 is repeated at the frame rate at which the display image is to be output. This permits high-quality display of a video in a manner reflecting the movements of the point of view and the changes of the texture image itself.

The above-described embodiment determines and samples the region on the texture image plane corresponding to each pixel of the display image in the display image generating process using the texture image. In so doing, the present embodiment carries out the calculations related to the texture image in detailed units and in parallel with the rendering of the display image. At this time, the region is determined in the texture image in a manner reflecting the angle of the object surface targeted for mapping and the distance from the point of view to the object surface. In accordance with the size and shape of the region thus determined, the number of sampling points and their distribution are controlled. This permits appropriately proportioned sampling. As a result, a high-resolution image is generated with little aliasing and without recourse to MIP maps. Likewise, because suitably proportioned sampling is always carried out even if the texture image is of high resolution, there is consequently high robustness against varying magnifications of the texture image in the display image.

When the region corresponding to one pixel is approximated using a parallelogram, sampling points are suitably determined by similar and simplified calculations regardless of where the point of view is positioned. This technique involves directly referencing the texture image at the time of rendering and simultaneously implementing the reduction process by controlling sampling points. This makes it possible to render a high-quality image even if there is not enough time to prepare MIP maps such as when the texture image is a video. Furthermore, memory capacity is saved because there is no need to store MIP maps.

In addition, because the referencing units are localized, the display image that uses the texture image can be rendered even if generation of the texture image is not complete. That is, the process of generating the texture image and the process of generating the display image can be performed in parallel. Since the sampling process itself is simplified, parallel processing is made possible using a bilinear sampling circuit. This proves to be especially effective in suppressing latency where the texture image is a video.

The present invention has been described above in conjunction with a specific embodiment. It is to be understood by those skilled in the art that suitable combinations of constituent elements and various processes of the present embodiment described above as an example will lead to further variations of the present invention and that such variations also fall within the scope of the present invention.

Although the above-described embodiment has focused primarily on how to map the texture image to the surface of an object in the virtual world, this is not limitative of how the present embodiment is applied. For example, if lenses are interposed between the display panel and the user's eyes as mentioned above, it is necessary to distort the display image in the reverse direction of the distortion caused by the lenses so that the image will be viewed normally through the lenses. In this case, it may be assumed that the image before distortion correction is the texture image and the image after distortion correction is the display image. Based on this assumption, it is possible to perform pixel-by-pixel correction using similar calculations to those of the above embodiment.

In the above alternative, the region of the image before correction corresponding to one pixel of the display image remains unchanged. It follows that the number of sampling points and their distribution in the region can be prepared corresponding to the pixel. Also in this case, the display image can be rendered using only the necessary regions. That means the display image can start to be output without waiting for the entire image to be generated before correction. This makes it possible to minimize temporal repercussions resulting from the distortion correcting process when, for example, the data of the captured image or of the generated original image is acquired in order of raster scan for instantaneous display.

REFERENCE SIGNS LIST

8 Information processing system, 10 Information processing apparatus, 12 Imaging device, 14 Input device, 16 Flat-screen display device, 18 HMD, 72 Input information acquiring section, 74 Target space controlling section, 76 Corresponding region identifying section, 78 Texture image generating section, 80 Image data storing section, 82 Pixel value calculating section, 84 Display image generating section.

INDUSTRIAL APPLICABILITY

As described above, the present invention is applicable to a game machine, an information processing apparatus, a mobile terminal, an image processing apparatus, an image display apparatus, and a system that includes any one of these devices and apparatuses, among others.

The invention claimed is:

1. An image processing apparatus comprising:
a corresponding region identifying section configured to determine, based on positional relations between a surface to which to map a texture image in a target space for rendering and a screen plane on which to define a display image, a region on the plane of the texture image such that the region corresponds to each of pixels representing the surface for mapping from pixels of the display image; and
a pixel value calculating section configured to sample texel values in the corresponding region so as to determine and output the value of the pixel representing the surface for mapping,
wherein the pixel value calculating section changes the number of sampling points in accordance with a size of the corresponding region.

2. The image processing apparatus according to claim 1, wherein the pixel value calculating section changes distribution of the sampling points in accordance with a shape of the corresponding region.

3. The image processing apparatus according to claim 1, wherein the corresponding region identifying section calculates partial differential values of functions for transforming position coordinates on the screen plane to corresponding position coordinates on the texture image plane, the corresponding region identifying section further determining the corresponding region based on the partial differential values.

4. The image processing apparatus according to claim 3, wherein the corresponding region identifying section determines as the corresponding region a parallelogram having sides positioned in the same directions as vectors having the partial differential values as components of the vectors.

5. The image processing apparatus according to claim 4, wherein the pixel value calculating section changes the number of the sampling points in accordance with the lengths of the sides of a rectangle circumscribing the parallelogram.

6. An information processing apparatus comprising:
an image processing apparatus including
a corresponding region identifying section configured to determine, based on positional relations between a surface to which to map a texture image in a target space for rendering and a screen plane on which to define a display image, a region on the plane of the texture image such that the region corresponds to each of pixels representing the surface for mapping from pixels of the display image, and
a pixel value calculating section configured to sample texel values in the corresponding region so as to determine and output the value of the pixel representing the surface for mapping,
the pixel value calculating section changing the number of sampling points in accordance with a size of the corresponding region;
a target space controlling section configured to establish the screen plane with respect to a point of view for the target space for rendering and to notify the image processing apparatus of the established screen plane; and
a display image generating section configured to determine the value of a pixel other than the pixel value output by the image processing apparatus so as to complete the display image to be output.

7. The information processing apparatus according to claim 6, further comprising:
a texture image generating section configured to generate a video as the texture image.

8. An image processing method comprising:
determining, based on positional relations between a surface to which to map a texture image in a target space for rendering and a screen plane on which to define a display image, a region on the plane of the texture image such that the region corresponds to each of pixels representing the surface for mapping from pixels of the display image; and
sampling texel values in the corresponding region by referencing a texture image stored in a memory so as to determine and output the value of the pixel representing the surface for mapping,
wherein the determining the pixel value changes the number of sampling points in accordance with a size of the corresponding region.

9. A non-transitory computer readable medium having stored thereon a computer program for a computer, the computer program comprising:
by a corresponding region identifying section, determining, based on positional relations between a surface to which to map a texture image in a target space for rendering and a screen plane on which to define a display image, a region on the plane of the texture image in such a manner that the region corresponds to each of pixels representing the surface for mapping from pixels of the display image; and by a pixel value calculating section, sampling texel values in the corresponding region so as to determine and output the value of the pixel representing the surface for mapping,
wherein the determining the pixel value changes the number of sampling points in accordance with a size of the corresponding region.

* * * * *